United States Patent
Hwang et al.

(10) Patent No.: US 12,400,366 B2
(45) Date of Patent: Aug. 26, 2025

(54) DEVICE FOR CALCULATING CALIBRATION DATA OF IMAGES

(71) Applicant: SK hynix Inc., Icheon-si (KR)

(72) Inventors: Ji Ye Hwang, Icheon-si (KR); Hyung Jun Han, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 31 days.

(21) Appl. No.: 18/428,260

(22) Filed: Jan. 31, 2024

(65) Prior Publication Data
US 2025/0014220 A1    Jan. 9, 2025

(30) Foreign Application Priority Data
Jul. 6, 2023    (KR) .................. 10-2023-0087476

(51) Int. Cl.
*G06T 7/80* (2017.01)
*G06T 7/11* (2017.01)
*G06T 7/90* (2017.01)
*H04N 17/00* (2006.01)

(52) U.S. Cl.
CPC .................. *G06T 7/80* (2017.01); *G06T 7/11* (2017.01); *G06T 7/90* (2017.01); *H04N 17/002* (2013.01); *G06T 2207/10024* (2013.01); *G06T 2207/20021* (2013.01)

(58) Field of Classification Search
CPC ..... G06T 7/80; G06T 7/11; G06T 7/90; G06T 2207/10024; G06T 2207/20021; H04N 17/002
See application file for complete search history.

(56) References Cited

U.S. PATENT DOCUMENTS

| | | |
|---|---|---|
| 10,375,292 B2 | 8/2019 | Park |
| 11,379,997 B2 * | 7/2022 | Lee .................. G06T 7/254 |
| 2019/0188525 A1 * | 6/2019 | Choi .................. G06N 3/045 |
| 2021/0133986 A1 * | 5/2021 | Lee .................. G06T 7/0002 |

FOREIGN PATENT DOCUMENTS

KR    20220006522 A    1/2022

* cited by examiner

*Primary Examiner* — Yassin Alata
(74) *Attorney, Agent, or Firm* — Perkins Coie LLP

(57) ABSTRACT

A device for calculating calibration data of images is provided to include a channel and region separator configured to generate channel images by separating a raw image received from an image sensor into images for each color and each channel corresponding to each pixel group of the image sensor and to separate each of the channel images into a plurality of regions of interest (ROIs), a channel signal extractor configured to obtain channel signals from the plurality of ROIs of the channel images, a deviation calculator configured to calculate channel deviations between channel signals of the ROIs located at a same position in the channel images having a same color, and a calibration value calculator configured to calculate channel calibration values for each ROI based on the channel deviations and the channel signals.

19 Claims, 5 Drawing Sheets

FIG. 3C

DEVICE FOR CALCULATING CALIBRATION DATA OF IMAGES

CROSS-REFERENCE TO RELATED APPLICATION

This patent document claims the priority and benefits of Korean patent application No. 10-2023-0087476, filed on Jul. 6, 2023, which is incorporated by reference in its entirety as part of the disclosure of this patent document.

TECHNICAL FIELD

The technology and implementations disclosed in this patent document generally relate to a device for calculating calibration data.

BACKGROUND

An image sensing device is used in electronic devices to convert optical images into electrical signals. With the development of automotive, medical, computer and communication industries, the demand for high-performance image sensing devices is increasing in various fields such as smart phones, digital cameras, game machines, IoT (Internet of Things), robots, security cameras and medical micro cameras.

The image sensing device may include a phase-difference detection autofocus (PDAF) function that automatically focuses by detecting a phase difference between adjacent pixels. In order to improve the PDAF function, a structure in which a plurality of pixels of the same color is adjacently arranged and one microlens is applied to the plurality of pixels has recently been widely used in the image sensing devices.

SUMMARY

Various embodiments of the disclosed technology relate to a device capable of calculating calibration data for calibrating a signal branching phenomenon between channels due to manufacturing process errors.

In accordance with an embodiment of the disclosed technology, a device for calculating calibration data of images may include: a channel and region separator configured to generate channel images by separating a raw image received from an image sensor into images for each color and each channel corresponding to each pixel group of the image, and to separate each of the channel images into a plurality of regions of interest (ROIs); a channel signal extractor configured to obtain channel signals from the plurality of ROIs of the channel images; a deviation calculator configured to calculate channel deviations between channel signals of the ROIs located at a same position in the channel images having a same color; and a calibration value calculator configured to calculate channel calibration values for each ROI based on the channel deviations and the channel signals.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

FIG. 3C is a conceptual diagram illustrating an example of a method for separating a channel image into a plurality of regions of interest (ROIs) based on some implementations of the disclosed technology.

DETAILED DESCRIPTION

This patent document provides implementations and examples of image processing techniques and devices for calculating calibration data required to calibrate signals of an image sensor that may be used to substantially address one or more technical or engineering issues and mitigate limitations or disadvantages encountered in some other devices. For example, if an overlay error occurs between some structures of the image sensing device during the manufacturing process, the overlay error causes signal branching between adjacent pixels that share the same microlens for receiving incident light. The signal branching between adjacent pixels, which may be referred to as the inter-channel signal branching, can cause the autofocus function in an imaging device to fail. The image processing techniques and devices disclosed in this patent document may be implemented in ways to address the errors generated in the manufacturing process of the image sensors and to provide signal processing techniques for calibrating inter-channel signal branching between channels associated with different adjacent pixels in an imaging sensor array.

Some implementations of the disclosed technology suggest examples of a device capable of calculating calibration data for calibrating a signal branching phenomenon between channels due to manufacturing process errors. The disclosed technology provides various implementations of the image sensing device which can calibrate overlay errors caused by the manufacturing process errors in a signal processing step, thereby improving the autofocus function.

Reference will now be made in detail to certain embodiments, examples of which are illustrated in the accompanying drawings. Wherever possible, the same reference numbers will be used throughout the drawings to refer to the same or similar parts. In the following description, a detailed description of related known configurations or functions incorporated herein will be omitted to avoid obscuring the subject matter.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Figure 1:
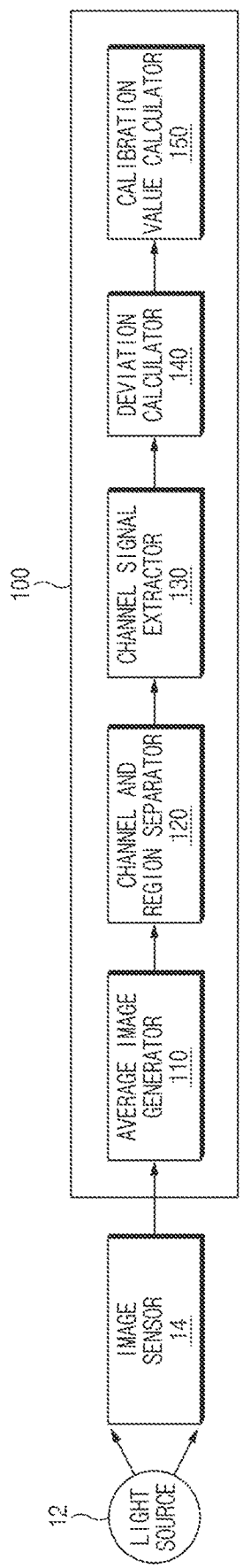
FIG. 1 is a block diagram illustrating an example of an imaging device based on some implementations of the disclosed technology.
Figure 2:
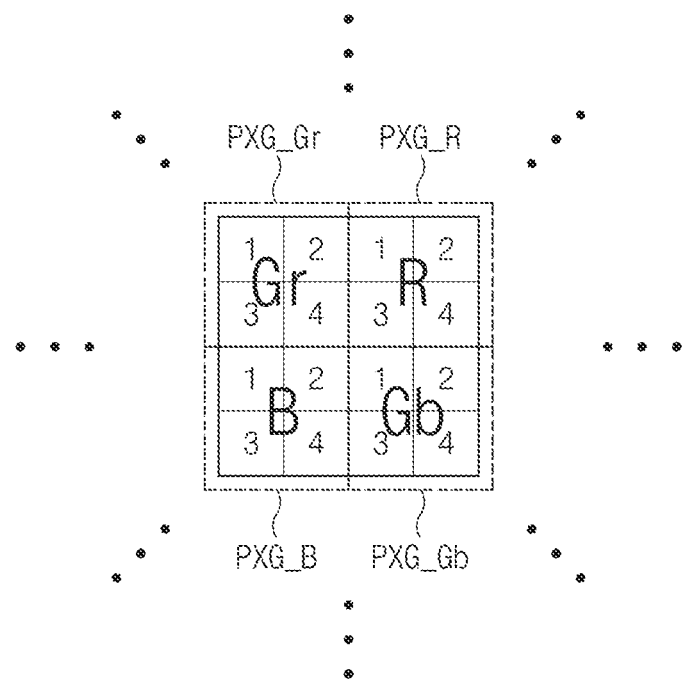
FIG. 2 is a schematic diagram illustrating an example of a pixel array included in an image sensor of FIG. 1 based on some implementations of the disclosed technology.
Figure 3A:
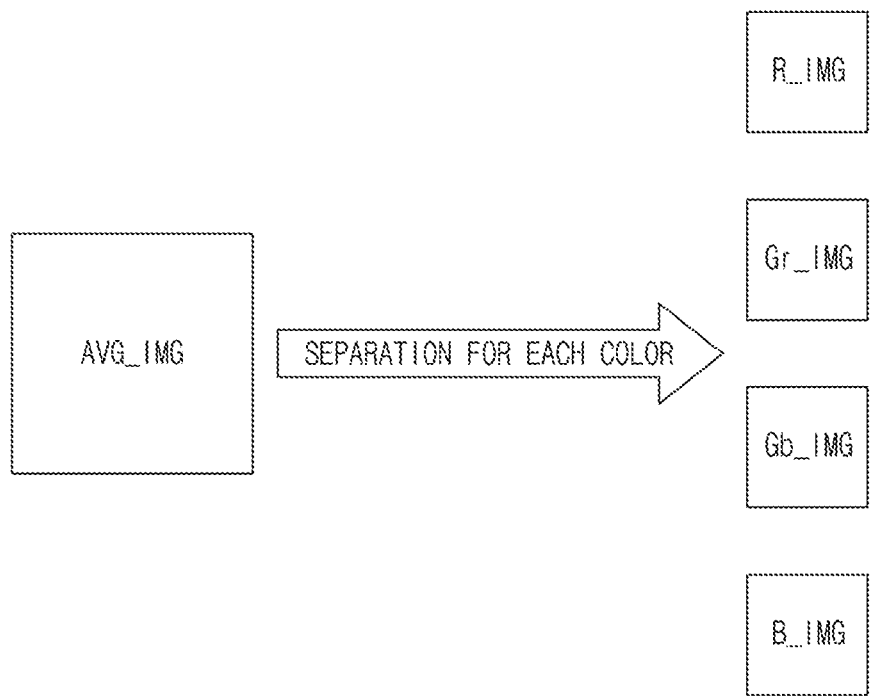
FIG. 3A is a conceptual diagram illustrating an example of a method for separating an average image into a plurality of color images based on some implementations of the disclosed technology.
Figure 3B:
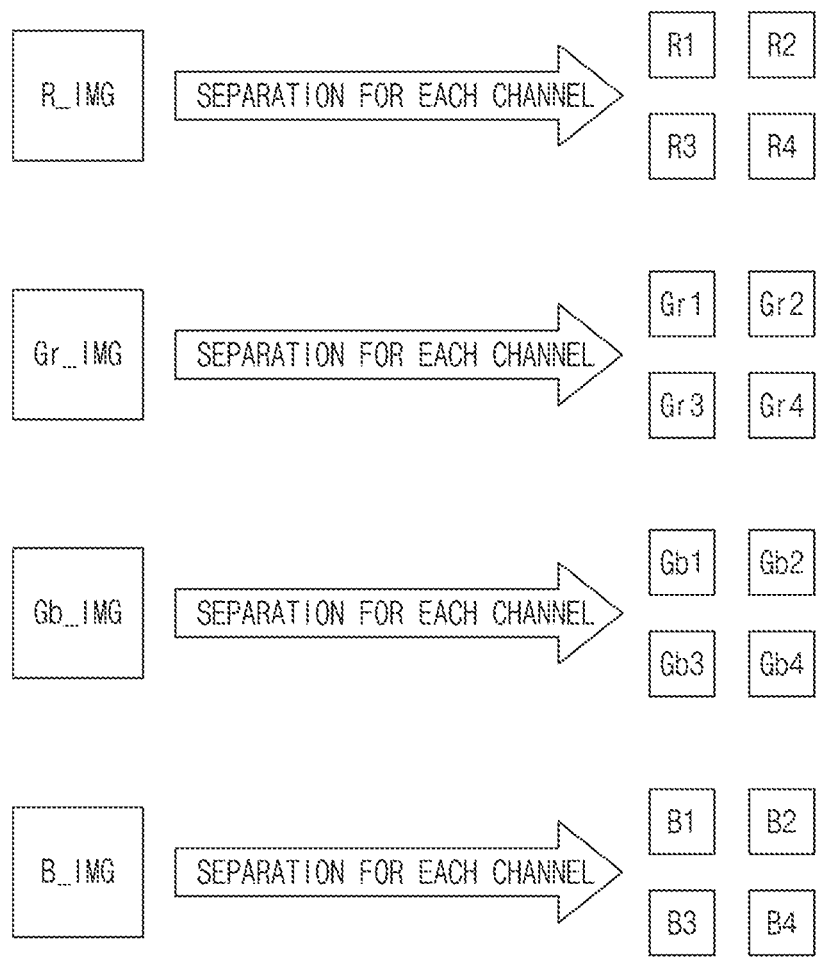
FIG. 3B is a conceptual diagram illustrating an example of a method for separating each color image into a plurality of channel images based on some implementations of the disclosed technology.
Figure 3C:
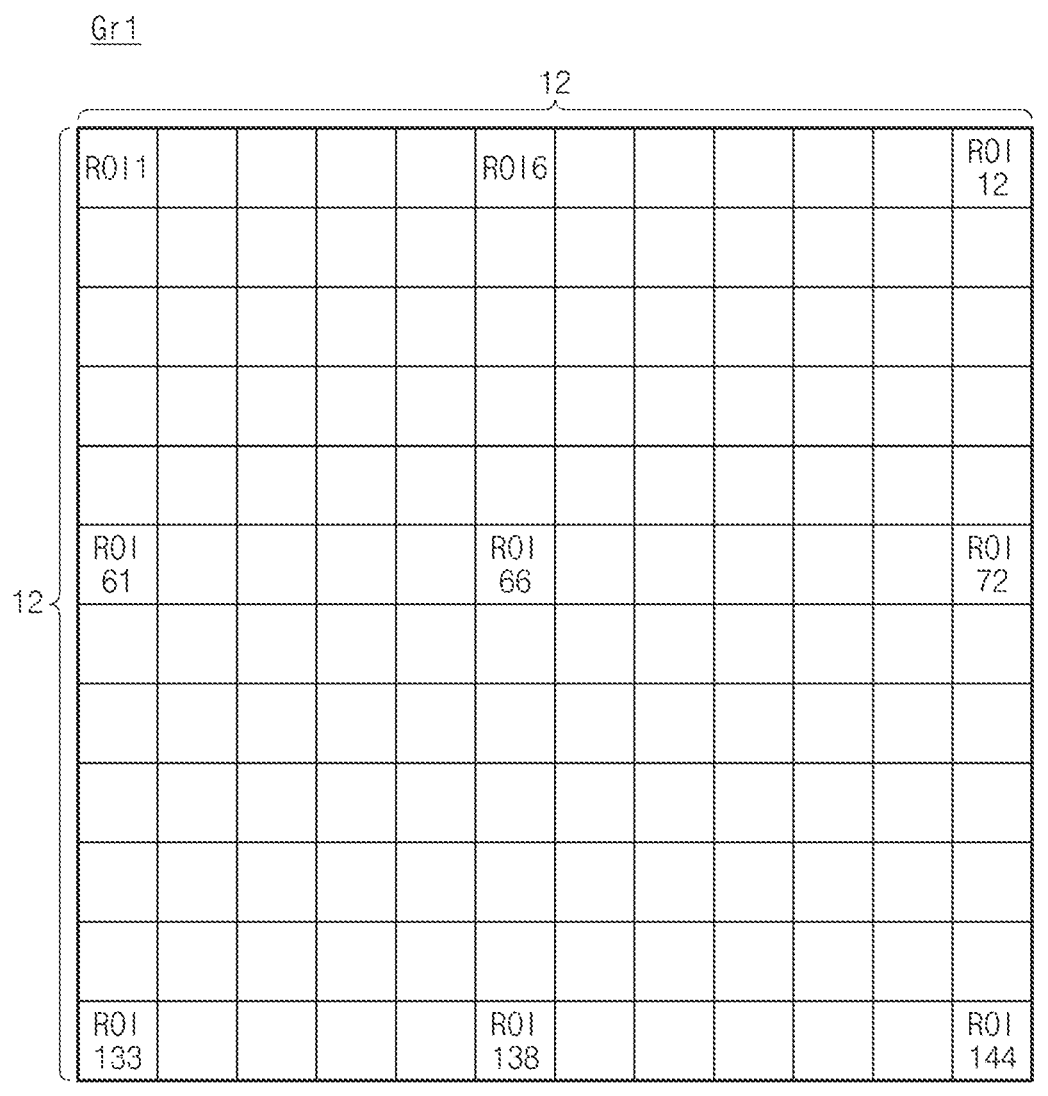

FIG. 1 is a block diagram illustrating an example of an imaging processing device 100 for calibrating image signals from an image sensor based on some implementations of the disclosed technology. FIG. 2 is a schematic diagram illustrating an example of a pixel array included in an image sensor of FIG. 1 based on some implementations of the disclosed technology. FIGS. 3A to 3C are diagrams illustrating examples of methods for operating a channel and region separator 120 of the exemplary imaging processing device 100 in FIG. 1 based on some implementations of the disclosed technology.

Referring to FIGS. 1, 2, and 3A to 3C, the calibration data calculation part of the imaging processing device 100 may include an average image generator 110, a channel and region separator 120, a channel signal extractor 130, a deviation calculator 140, and a calibration value calculator 150.

The calibration data calculation part of the imaging processing device 100 may perform a calibration of data based on measurements obtained during a test process an image sensor before releasing the image sensor into the market. The calibration data calculation part of the imaging processing device 100 may detect or recognize the degree of channel branching between adjacent pixels of the image sensor in the test process before the image sensor is commercialized and released, and may calculate calibration data corresponding to the degree of channel branching.

Referring to FIG. 2, the pixel array of the image sensor 14 may include a plurality of pixel groups (PXG_R, PXG_Gr, PXG_Gb, PXG_B) in which four unit pixels having the same color are adjacently arranged in a (2×2) matrix. Each pixel group (PXG_R, PXG_Gr, PXG_Gb, or PXG_B) may include four channels corresponding to four adjacent unit pixels for filtering incident light to detect or sense light of the same color, respectively, and the colors (R, Gr, Gb, B) corresponding to the pixel groups (PXG_R, PXG_Gr, PXG_Gb, PXG_B) may be arranged in, for example, a Bayer pattern of different color filters with 50% green, 25% red and 25% blue in the light intensity. In FIG. 2, a number written in each pixel may indicate a channel of each pixel within a corresponding pixel group. Accordingly, raw images generated through photographing by the image sensor 14 may include color image pixels arranged in the same structure as the pixel array described above.

The image sensor 14 may generate a raw image by photographing light emitted from a light source 12 while changing an integration time of photocharges generated by incident light. Such photographing may be performed while gradually increasing the integration time (exposure time) until all of the pixels of the image sensor 14 become saturated. In this imaging process, the image sensor 14 may generate a plurality of raw images by performing image capture several times (e.g., five times) for each integration time. A plurality of raw images generated by the image sensor 14 for each integration time may be input to the average image generator 110 of the imaging processing device 100.

Upon receiving a plurality of raw images for each integration time from the image sensor 14, the average image generator 110 may average the plurality of raw images to generate one average image (AVG_IMG) for each integration time. The generated average image (AVG_IMG) for each integration time may be transmitted to the channel and region separator 120.

The channel and region separator 120 may separate the average images (AVG_IMG) for each integration time, which is provided from the average image generator 110, into a plurality of images for each color and each channel. Thus, the channel and region separator 120 may generate a plurality of per-channel images (R1~R4, Gr1~Gr4, Gb1~Gb4, B1~B4). Under the Bayer pattern of different color filters with 50% green, 25% red and 25% blue in the light intensity, per-channel images R1~R4 correspond to the color red, R, the per-channel images Gr1~Gr4 correspond to the color green, Gr, the per-channel images Gb1~Gb4 correspond to the color green, Gb, and the per-channel images B1~B4 correspond to the color blue, B. In addition, the channel and region separator 120 may separate each of the per-channel images (R1~R4, Gr1~Gr4, Gb1~Gb4, B1~B4) into a plurality of preset regions of interest (ROIs). Hereinafter, the average image (AVG_IMG) for each integration time will be referred to as the average image (AVG_IMG).

For example, as shown in FIG. 3A, the channel and region separator 120 may first separate the average image (AVG_IMG) provided from the average image generator 110 into a plurality of images for each color (R, Gr, Gb, B) corresponding to each pixel group (PXG_R, PXG_Gr, PXG_Gb, PXG_B), may collect the same color images, and may thus generate four color images (R_IMG, Gr_IMG, Gb_IMG, B_IMG). The green colors (Gr, Gb) may have the same color, but are disposed at different positions within one Bayer pattern. Therefore, according to the present embodiment, the two green colors (Gr, Gb) from the two different pixel groups may be treated as different colors.

When the regions separated for each pixel group are collected for each of the colors (R, Gr, Gb, B) and color images (R_IMG, Gr_IMG, Gb_IMG, B_IMG) are created, the regions may be arranged in the order of corresponding pixel groups. The size of each of the color images (R_IMG, Gr_IMG, Gb_IMG, B_IMG) may be ¼ of the size of the average image (AVG_IMG).

Referring to FIG. 3B, the channel and region separator 120 may separate each color image (R_IMG, Gr_IMG, Gb_IMG, B_IMG) into a plurality of images for each channel, collect images of the same channels, thereby generating 16 channel images (R1~R4, Gr1~Gr4, Gb1~Gb4, B1~B4). Thus, four channel images may be generated for each color image (R_IMG, Gr_IMG, Gb_IMG, B_IMG).

When regions (pixels) separated for each channel are collected for each channel to create channel images (R1~R4, Gr1~Gr4, Gb1~Gb4, B1~B4), the corresponding regions may be arranged in the order of corresponding color images. The size of each of the channel images (R1~R4, Gr1~Gr4, Gb1~Gb4, B1~B4) may be 1/16 of the size of the average image (AVG_IMG).

The channel and region separator 120 may separate each of the channel images (R1~R4, Gr1~Gr4, Gb1~Gb4, B1~B4) into (N×N) regions of interest (ROIs) (where N is a natural number). FIG. 3C shows an example that a channel image Gr1 is separated into 12×12 ROIs. Assuming that each of channel images (R1~R4, Gr1~Gr4, Gb1~Gb4, B1~B4) is separated into 12×12 ROIs as shown in FIG. 3C, the channel and region separator 120 may separate each channel image (R1~R4, Gr1~Gr4, Gb1~Gb4, B1~B4) into 144 (=12×12) regions of interest (ROIs).

The number of ROIs (regions of interest) and the size of each ROI (i.e., the number of pixels included in each ROI) may be changed in various implementations without being limited to the above example as shown in FIG. 3C. For example, the channel and region separator 120 may separate each of the channel images (R1~R4, Gr1~Gr4, Gb1~Gb4, B1~B4) into a plurality of ROIs each having a smaller size (where the N value increases) than FIG. 3C, or may separate each of the channel images (R1~R4, Gr1~Gr4, Gb1~Gb4, B1~B4) into a plurality of ROIs each having a larger size (where the N value decreases) than FIG. 3C. In some implementations, the channel and region separator 120 may separate each of the channel images (R1~R4, Gr1~Gr4, Gb1~Gb4, B1~B4) into M×N (M≠N, where M is a natural number) ROIs.

In the above-described embodiment, each of the channel images (R1~R4, Gr1~Gr4, Gb1~Gb4, B1~B4) is separated into predetermined number (e.g., N×N or M×N) ROIs. In some implementations, the size of the ROIs may be predetermined. When each of the channel images (R1~R4, Gr1~Gr4, Gb1~Gb4, B1~B4) is separated into predetermined number (e.g., N×N or M×N) ROIs, if the specification (e.g., a total number of pixels) of the product (i.e., the image sensor) is changed, the number of pixels included in the ROIs may also be changed. If the size of the ROIs is predetermined, since the size (i.e., the number of pixels) of ROIs is fixed in advance, the channel and region separator 120 may separate channel images (R1~R4, Gr1~Gr4, Gb1~Gb4, B1~B4) from each other based on the respective sizes of the fixed ROIs.

Although, in the present embodiment, the image sensor 14 generates a plurality of raw images for each integration time, other implementations are also possible. For example, when the image sensor 14 outputs one raw image for each integration time, the average image generator 110 may be omitted. For example, the raw images for each integration time, which are output from the image sensor 14, may be directly provided to the channel and region separator 120 to be separated for each color and/or for each channel.

The channel signal extractor 130 may extract (or obtain) channel signals for each ROI separated by the channel and region separator 120. For example, the channel signal extractor 130 may extract channel signals for each of the ROIs (ROI1~ROI144) of each of the channel images (R1~R4, Gr1~Gr4, Gb1~Gb4, B1~B4). In some implementations, the channel signal extractor 130 may average signal values of pixels included in the corresponding ROI from among the ROIs (ROI1~ROI144), and may extract the average signal value as a channel signal for the corresponding ROI. In this implementation, channel signals for each of the ROIs (ROI1~ROI144) may be extracted for each integration time. The extracted channel signals for each ROI (e.g., an average signal value of the ROIs) may be provided to the deviation calculator 140.

The deviation calculator 140 may calculate a channel deviation for each ROI using the channel signals for each ROI of each of the channel images (R1~R4, Gr1~Gr4, Gb1~Gb4, B1~B4) provided from the channel signal extractor 130. The deviation calculator 140 may calculate channel deviations indicating how far channel signals of ROIs located at the same position within four corresponding channel images (R1~R4, Gr1~Gr4, Gb1~Gb4, B1~B4) for each color image (R_IMG, Gr_IMG, Gb_IMG, B_IMG) (e.g., within four channel images having the same color) deviate from a center value (e.g., an average value of the channel signals) of the channel signals.

For example, for the color image (Gr_IMG), the color image (Gr_IMG) is separated into four channel images (GR1, GR2, GR3, and GR4). Each channel image (GR1, GR2, GR3, and GR4) is then separated into the ROIs. For channel signals (Gr1_ROI1_CS, Gr2_ROI1_CS, Gr3_ROI1_CS, Gr4_ROI1_CS) for ROI1 of each channel image (GR1, GR2, GR3, and GR4), the deviation calculator 140 may calculate an average value (Gr_ROI1_CSavg) of four channel signals (Gr1_ROI1_CS, Gr2_ROI1_CS, Gr3_ROI1_CS, Gr4_ROI1_CS) for each ROI (ROI1) of each of the four channel images (Gr1~Gr4), may divide each of the channel signals (Gr1_ROI1_CS, Gr2_ROI1_CS, Gr3_ROI1_CS, Gr4_ROI1_CS) by the average value (Gr_ROI1_CSavg) to obtain four values, and may determine the four values to be channel deviations (Gr1_ROI1_Cal_ratio, Gr2_ROI1_Cal_ratio, Gr3_ROI1_Cal_ratio, Gr4_ROI1_Cal_ratio) for the corresponding ROI (ROI1). Thus, the channel deviation (Gr1_ROI1_Cal_ratio) may indicate a channel deviation of the ROI (ROI1) of the channel image (Gr1), the channel deviation (Gr2_ROI1_Cal_ratio) may indicate a channel deviation of the ROI (ROI1) of the channel image (Gr2), the channel deviation (Gr3_ROI1_Cal_ratio) may indicate a channel deviation of the ROI (ROI1) of the channel image (Gr3), and the channel deviation (Gr4_ROI1_Cal_ratio) may indicate a channel deviation of the ROI (ROI1) of the channel image (Gr4).

The deviation calculator 140 may calculate channel deviations for all ROIs (ROI1~ROI144) of the channel images (Gr1~Gr4). In addition, the deviation calculator 140 may calculate channel deviations for each ROI with respect to the channel images (R1~R4, Gr1~Gr4, Gb1~Gb4, B1~B4) of all color images (R_IMG, Gr_IMG, Gb_IMG, B_IMG).

In the implementations, these channel deviations may be calculated for each integration time. For example, the deviation calculator 140 may obtain channel deviations only for valid integration times, and may determine the average value of the channel deviations to be the final channel deviation. In some implementations, the valid integration time may refer to an integration time in which all signal values of channel signals of the ROIs located at the same position within channel images of the same color are within a predetermined range (e.g., 300 to 800 LSB (Least Significant Bit)s).

For example, the deviation calculator 140 may calculate channel deviations for each integration time, may calculate an average value for each channel only for channel deviations corresponding to valid integration times from among the calculated channel deviations, and may determine the calculated average values to be final channel deviations. If only one valid integration time exists or if the present embodiment is implemented only for any one of the integration times, then the channel deviations for this one integration time may become final channel deviations.

The calibration value calculator 150 may calculate calibration values, which may be referred to as channel calibration values, for each ROI of the channel images (R1~R4, Gr1~Gr4, Gb1~Gb4, B1~B4) by using channel deviations (e.g., final channel deviations) calculated by the deviation calculator 140, a preset calibration constant, and channel signals extracted by the channel signal extractor 130. For example, the calibration value calculator 150 may calculate a channel calibration value for each ROI with respect to the channel images (R1~R4, Gr1~Gr4, Gb1~Gb4, B1~B4) by using the following equations 1 to 4.

The following equations 1 to 4 may illustrate example cases in which channel calibration values (ROI1_Gr1_Cal, ROI1_Gr2_Cal, ROI1_Gr3_Cal, ROI1_Gr4_Cal) are calculated for each ROI1 that is located at the same position of the corresponding channel images (Gr1~Gr4). In the example, the channel calibration values are calculated for ROI1 of each channel image, but other implementations are also possible. For example, the channel calibration values can be calculated for ROI1 of each channel image.

$$\text{ROI1\_Gr1\_Cal} = \text{Gr1\_ROI1\_CS} \times \{\text{abs}(1 - \text{Gr1\_ROI1\_Cal\_ratio}) + 1\} \times (\text{Calibration Constant}) \quad \text{[Equation 1]}$$

$$\text{ROI1\_Gr2\_Cal} = \text{Gr2\_ROI1\_CS} \times \{\text{abs}(1 - \text{Gr2\_ROI1\_Cal\_ratio}) + 1\} \times (\text{Calibration Constant}) \quad \text{[Equation 2]}$$

$$\text{ROI1\_Gr3\_Cal} = \text{Gr3\_ROI1\_CS} \times \{\text{abs}(1 - \text{Gr3\_ROI1\_Cal\_ratio}) + 1\} \times (\text{Calibration Constant}) \quad \text{[Equation 3]}$$

$$\text{ROI1\_Gr4\_Cal} = \text{Gr4\_ROI1\_CS} \times \{\text{abs}(1 - \text{Gr4\_ROI1\_Cal\_ratio}) + 1\} \times (\text{Calibration Constant}) \quad \text{[Equation 4]}$$

In Equations 1 to 4, 'Gr1_ROI1_CS~Gr4_ROI1_CS' may refer to signal values of channel signals extracted by the channel signal extractor 130 for the ROI1 of the channel images (Gr1~Gr4). 'Gr1_ROI1_Cal_ratio~Gr4_ROI1_Cal_ratio' may refer to channel deviations (e.g., the final channel deviations) calculated by the deviation calculator 140 by using signal values (Gr1_ROI1_CS~Gr4_ROI1_CS) of the channel signals and an average signal value of the signal values. The calibration constant may be set to '1' when the corresponding channel deviation (Gr1_ROI1_Cal_ratio~Gr4_ROI1_Cal_ratio) is greater than 1, and may be set to '1.1' when the corresponding channel deviation is less than '1'. In addition, "abs" may refer to an absolute value.

If the channel signals of the ROIs (ROI1) located at the same position within the channel images (Gr1~Gr4) are all the same, the channel deviations (Gr1_ROI1_Cal_ratio~Gr4_ROI1_Cal_ratio) of the ROIs (ROI1) are all "1". Therefore, in the above equations 1 to 4, a difference between each channel deviation (Gr1_ROI1_Cal_ratio~Gr4_ROI1_Cal_ratio) and the value of "1" may be a difference between each of channel deviations obtained when the channel signals of the ROIs (ROI1) located at the same position are equal to each other and each of channel deviations (i.e., actual channel deviations) calculated by the deviation calculator 140 for the corresponding ROI (ROI1). The calibration value calculator 150 may calculate channel calibration values by multiplying a value proportional to the difference by the channel signals of the corresponding ROIs (ROI1).

Since the channel images (Gr1~Gr4) are obtained by separating the color images (Gr_IMG) for each channel, a region obtained by a combination of the ROIs (ROI1) of the channel images (Gr1~Gr4) may refer to a region located at a position corresponding to the ROI (ROI1) when the color image (Gr_IMG) is divided into (12×12) images. Accordingly, the channel deviations (Gr1_ROI1_Cal_ratio, Gr2_ROI1_Cal_ratio, Gr3_ROI1_Cal_ratio, Gr4_ROI1_Cal_ratio) may be channel deviations for the ROI (ROI1) in the color image (Gr_IMG). The channel calibration values for the channel deviations (Gr1_ROI1_Cal_ratio, Gr2_ROI1_Cal_ratio, Gr3_ROI1_Cal_ratio, Gr4_ROI1_Cal_ratio) may be channel calibration values for the ROI (ROI1) in the color image (Gr_IMG).

Similarly, since the color images (R_IMG, Gr_IMG, Gb_IMG, B_IMG) are obtained by separating the average image (AVG_IMG) into images for each color, a region obtained by a combination of some regions corresponding to the ROIs (ROI1) in the color images (R_IMG, Gr_IMG, Gb_IMG, B_IMG) may be a region located at a position corresponding to the ROI (ROI1) when the average image (AVG_IMG) is divided into (12×12) images. Therefore, channel calibration values for the channel deviations (Gr1_ROI1_Cal_ratio, Gr2_ROI1_Cal_ratio, Gr3_ROI1_Cal_ratio, Gr4_ROI1_Cal_ratio) may become channel calibration values for the pixel groups (PXG_Gr) located at the region corresponding to the ROI (ROI1) in the average image (AVG_IMG).

Through the above-described method, when channel calibration values are calculated for each ROI (ROI1~ROI144) with respect to all channel images (R1~R4, Gr1~Gr4, Gb1~Gb4, B1~B4), channel calibration values for the entire average image (AVG_IMG) may be calculated. These channel calibration values may be calculated for each integration time.

In the above-described embodiments as shown in FIGS. 3A to 3C, the average image (AVG_IMG) is separated into color images for each color (R_IMG, GR_IMG, Gb_IMG, B_IMG), which correspond to pixel groups. Each color image (R_IMG, GR_IMG, Gb_IMG, B_IMG) is then separated for each channel to generate channel images (R1~R4, Gr1~Gr4, Gb1~Gb4, B1~B4), and each of the channel images is separated into (12×12) ROIs. In some other implementations, the average image may be first separated into (12×12) ROIs, the ROIs are separated for each color corresponding to each pixel group to generate color images. Then, the color images may be separated again for each channel to generate channel images, and the channel calibration values may also be calculated for each channel image.

The channel calibration values calculated by the above-described image calibration device may be stored in memories of the image sensors manufactured through the same processes as those of the image sensors 14, such that the channel calibration values may be used to calibrate image signals in the image sensors. For example, the image sensor may separate the captured image into (12×12) ROIs (ROI1~ROI144), may multiply channel values (i.e., signal values of the pixel signals) of each pixel group (PXG_R, PXG_Gr, PXG_Gb, PXG_B) for each ROI by channel calibration values stored in the memory, and may thus minimize the degree of signal branching for each channel.

As is apparent from the above description, the image sensing device based on some implementations of the disclosed technology can calibrate overlay errors caused by the manufacturing process errors in a signal processing step, thereby improving the autofocus function.

The embodiments of the disclosed technology may provide a variety of effects capable of being directly or indirectly recognized through the above-mentioned patent document.

Although a number of illustrative embodiments have been described, it should be understood that various modifications or enhancements of the disclosed embodiments and other embodiments can be devised based on what is described and/or illustrated in this patent document.

What is claimed is:

1. A device for calculating calibration data of images, comprising:
   a channel and region separator configured to generate channel images by separating a raw image received from an image sensor into images for each color and each channel corresponding to each pixel group of the image sensor, and configured to separate each of the channel images into a plurality of regions of interest (ROIs);
   a channel signal extractor configured to obtain channel signals from the plurality of ROIs of the channel images;

a deviation calculator configured to calculate channel deviations between channel signals of the ROIs located at a same position in the channel images having a same color; and a calibration value calculator configured to calculate channel calibration values for each ROI based on the channel deviations and the channel signals.

2. The device according to claim 1, wherein the channel signal extractor is configured to:

obtain an average signal value of pixels included in each ROI as a channel signal of a corresponding ROI.

3. The device according to claim 1, wherein the deviation calculator is configured to:

calculate the channel deviations for each color belonging to a same pixel group.

4. The device according to claim 1, wherein the channel and region separator is configured to:

generate color images by separating the raw image into images for each color corresponding to each pixel group;

generate the channel images by separating each of the color images into images for each channel; and separate each of the channel images into (N×N) ROIs or (M×N) ROIs, N and M being natural numbers.

5. The device according to claim 4, wherein the deviation calculator is configured to:

calculate the channel deviations for each of the color images, and wherein corresponding channel images are separated from a same color image.

6. The device according to claim 5, wherein the deviation calculator is configured to:

calculate an average value of channel signals for the ROIs located at the same position;

determine the channel deviations of the ROIs by dividing the channel signals by the average value.

7. The device according to claim 1, wherein the channel and region separator is configured to:

generate color images by separating the raw image into images for each color corresponding to each pixel group;

generate the channel images by separating each of the color images into images for each channel; and separate each of the channel images into regions of interest (ROIs) having a predetermined size.

8. The device according to claim 1, wherein the calibration value calculator is configured to:

calculate a difference between i) channel deviations when channel signals of the ROIs located at the same position are equal to each other and ii) channel deviations calculated by the deviation calculator for the ROIs; and calculate the channel calibration values by multiplying values proportional to the difference by corresponding channel signals.

9. The device according to claim 1, wherein the channel and region separator is configured to:

generate the channel images for each integration time upon receiving the raw image for each integration time from an image sensor providing the raw image.

10. The device according to claim 9, wherein the channel and region separator is configured to:

for each integration time, generate color images by separating the raw image into images for each color corresponding to each pixel group;

generate the channel images by separating each of the color images into images for each channel; and separate each of the channel images into (N×N) ROIs or (M×N) ROIs, N and M being natural numbers.

11. The device according to claim 9, wherein the channel signal extractor is configured to:

for each integration time, obtain an average signal value of pixels included in each ROI as a channel signal of a corresponding ROI.

12. The device according to claim 9, wherein the deviation calculator is configured to:

for each integration time, obtain channel deviations between channel signals of regions of interest (ROIs) located at the same position with respect to each of colors belonging to a same pixel group; and output values obtained when channel deviations for valid integration times are averaged for each channel as final channel deviations.

13. The device according to claim 12, wherein the deviation calculator is configured to:

determine an integration time as a valid integration time when channel signals of the ROIs located at the same position for the integration time are all within a predetermined range.

14. The device according to claim 9, wherein the calibration value calculator is configured to:

calculate the channel calibration values for each integration time.

15. The device according to claim 1, further comprising:

an average image generator configured to receive a plurality of raw images for each integration time from the image sensor and generate one average image for the plurality of raw images for each integration time.

16. The device according to claim 15, wherein the channel and region separator is configured to:

generate the channel images by separating the average image for each integration time; and separate each of the channel images into the plurality of regions of interest (ROIs).

17. The device according to claim 15, wherein each of color images obtained by separating the average image for the each color has a size that is one fourth of a size of the average image.

18. The device according to claim 15, wherein each of the channel images obtained by separating a color image for the each channel have a size that is one sixteenth of a size of the average image.

19. The device according to claim 1, wherein each of the channel images has a size that is one fourth of a size of a color image obtained by separating the raw image for the each color.

* * * * *